United States Patent

Schivley

[11] Patent Number: 5,867,147
[45] Date of Patent: Feb. 2, 1999

[54] TAMPER-RESISTANT COMPUTER MOUSE

[76] Inventor: N. Catherine Schivley, 352 Kirksway La., Lake Orion, Mich. 48362

[21] Appl. No.: 835,833

[22] Filed: Apr. 16, 1997

[51] Int. Cl.$^6$ ............................................. G09G 5/08
[52] U.S. Cl. ............................................................ 345/163
[58] Field of Search ........................... 345/163, 164–167, 345/156, 157, 169, 179, 184

[56] References Cited

U.S. PATENT DOCUMENTS

| Re. 32,632 | 3/1988 | Atkinson . | |
|---|---|---|---|
| Re. 32,633 | 3/1988 | Hovey et al. . | |
| Re. 34,931 | 5/1995 | Duchon | 345/167 |
| 4,559,532 | 12/1985 | Hosogoe . | |
| 4,612,539 | 9/1986 | Hosogoe et al. . | |
| 4,623,787 | 11/1986 | Kim . | |
| 4,652,871 | 3/1987 | Tsukada et al. . | |
| 4,922,444 | 5/1990 | Baba . | |
| 4,933,670 | 6/1990 | Wislocki . | |
| 5,008,528 | 4/1991 | Duchon | 345/167 |
| 5,171,978 | 12/1992 | Mimlitch et al. | 345/167 |
| 5,208,736 | 5/1993 | Crooks et al. . | |
| 5,280,276 | 1/1994 | Kwok | 345/167 |
| 5,298,919 | 3/1994 | Chang . | |
| 5,345,253 | 9/1994 | Chang | 345/167 |
| 5,355,414 | 10/1994 | Hale et al. . | |
| 5,381,159 | 1/1995 | Oohori | 345/163 |
| 5,428,368 | 6/1995 | Grant . | |
| 5,457,479 | 10/1995 | Cheng . | |
| 5,486,845 | 1/1996 | Chait . | |
| 5,559,534 | 9/1996 | Lin . | |
| 5,610,632 | 3/1997 | Perry | 345/163 |
| 5,631,669 | 5/1997 | Stobbs et al. | 345/156 |
| 5,670,990 | 9/1997 | Bidiville et al. | 345/164 |

*Primary Examiner*—Xiao Wu
*Attorney, Agent, or Firm*—Harness, Dickey & Pierce, P.L.C.

[57] ABSTRACT

A computer mouse designed for reducing vandalism of its components. In the preferred embodiment, gripping surfaces are removed or impeded on the disk for holding the trackball in place. Accordingly, this makes it difficult for vandals to move the disk to its unlocked position to steal the ball or vandalize the components of the mouse.

6 Claims, 2 Drawing Sheets

U.S. Patent  Feb. 2, 1999  Sheet 1 of 2  5,867,147
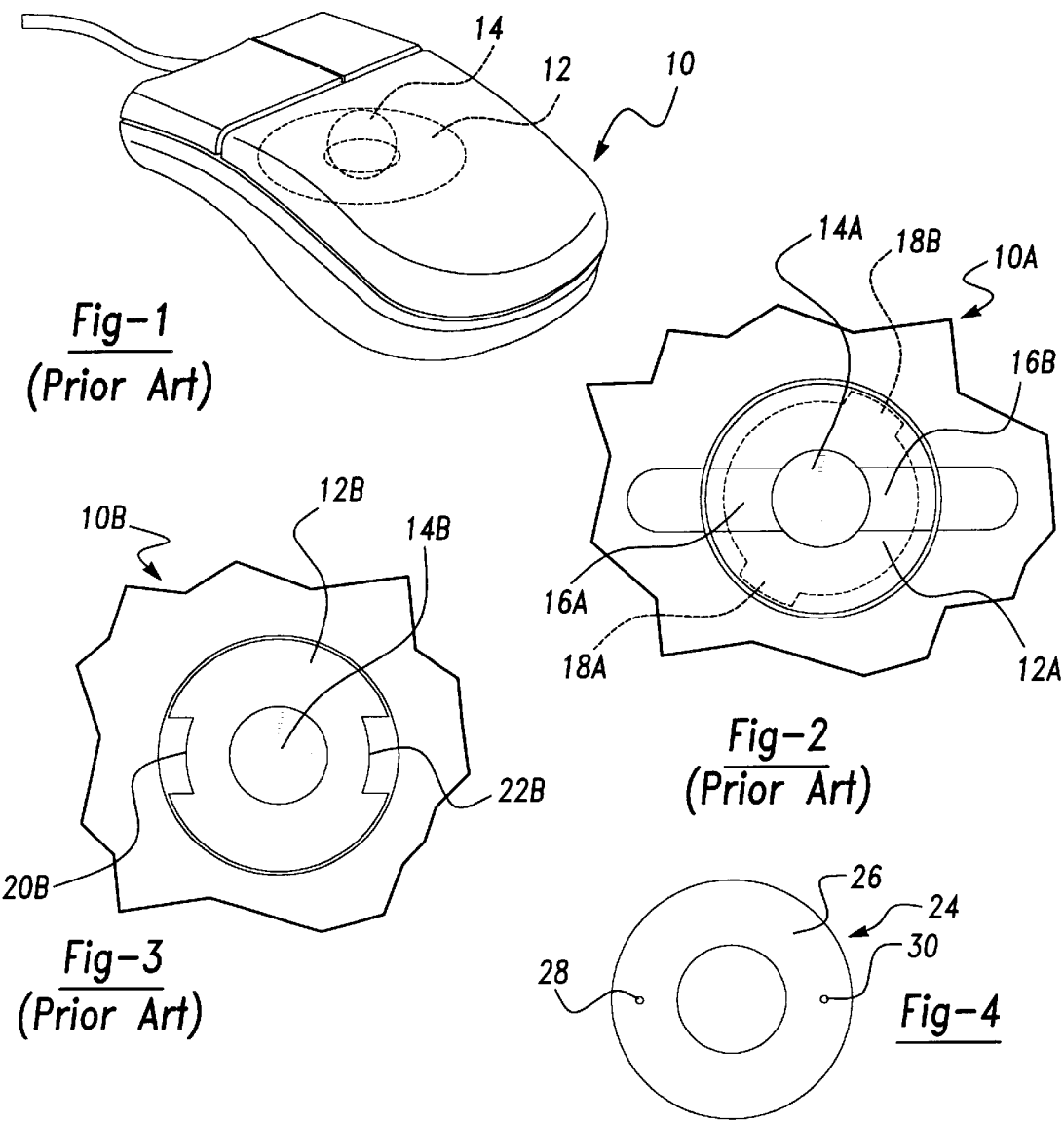
Fig-1 (Prior Art)
Fig-2 (Prior Art)
Fig-3 (Prior Art)
Fig-4
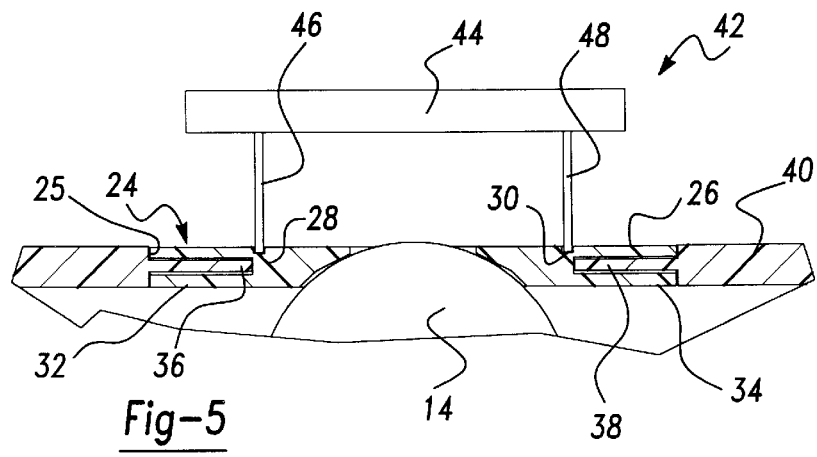
Fig-5

TAMPER-RESISTANT COMPUTER MOUSE

BACKGROUND OF THE INVENTION

1. Technical Field

This invention relates to computer peripheral devices and, more particularly, to techniques for preventing vandalism to a computer mouse.

2. Discussion

Computers are finding ever-increasing usage in high schools, universities and other institutions. Most modern-day computers include a computer mouse. The mouse typically includes a housing that is manipulated by the hand to move a trackball located on the housing's underneath surface. Rotation of the trackball is converted into signals which control the location of a cursor or the like on the computer display. The trackball is usually held in place by a removable disk. The disk generally includes some type of gripping surface that allows it to be rotated to remove the ball for cleaning.

FIG. 1 is a generic representation of a computer mouse 10. The removable disk 12 is shown in phantom lines as is the ball 14. Fairly universally, all of the disks 12 include some kind of gripping surfaces to allow the human fingers to grip them so that the disk may be moved to a position in which the disk 12 can be released to allow the ball 14 to fall out so that it can be cleaned.

FIG. 2 shows one class of mouse 10A in which the gripping surfaces are in the form of diametrically opposite indentations 16A and 16B. Other types of computer mice have similar indentations but are in different configurations. These indentations allow the human fingers to grasp the indentations and rotate the disk 12A to a release position. Most disks have undercut tangs 18A, 18B which, in a locked position, engage shelves or fingers formed in the body of the mouse, located on the underneath body surface, to lock the disk in place. When the disk 12A is rotated, in this case clockwise, the tangs 18A, 18B are aligned with reliefs in the mouse body to allow the disk to be removed from the mouse body to permit the ball 14 to be removed. FIG. 2 represents the current configuration of a Microsoft® mouse. An Apple® mouse is somewhat similar but it includes swirl indentations on the outer face of the disk. The computer mouse found on many Packard-Bell® computers includes raised ridges which allow human fingers to move the disk in a linear direction to unlock it to remove the ball.

FIG. 3 shows still another type of computer mouse 10B in which the disk 12B includes two diametrically opposite cutouts 20B, 22B that form gripping surfaces to allow the disk 12B to be similarly rotated to an unlocked position to remove ball 14B. This type of computer mouse generally represents that marketed by Logitek®.

It can be seen, therefore, that almost all currently marketed computer mice employ some type of gripping surface that allows human fingers to freely move the disk and remove the ball. Unfortunately, this freedom of use has been taken advantage by pubescent ner-do-wells or vandals who have no legitimate purpose for removing the trackballs except for deliberate mischievousness. This problem is especially pronounced in secondary educational facilities or other locations that are not specifically monitored. Once the trackball and/or disk has been lost, the computer mouse is obviously unusable. Quite often, it is either difficult or impossible to obtain replacement parts for the vandalized mouse. Accordingly, it often becomes necessary to replace the entire mouse at a sizeable cost to the institution.

Therefore, it would be desirable to provide a computer mouse that is tamper-resistant and which would allow only authorized personnel to remove the trackball for proper maintenance.

SUMMARY OF THE INVENTION

In accordance with the teachings of the present invention, some type of provision is made for preventing unauthorized removal of the trackball in a computer mouse. This can be accomplished in a variety of ways depending upon the configuration of the computer mouse and the disk that typically holds the trackball in place. In general, the gripping surfaces of the typical disk should be removed or impeded so that the disk cannot be removed by unauthorized users. In one embodiment, replacement disks are provided in which the gripping surfaces are removed and replaced by some type of construction that can be engaged with a tool supplied to authorized users. For example, the replacement disk may have an outer surface which is relatively smooth except for a plurality of small sockets which can be engaged by a specially designed tool that allows the disk to be rotated for authorized removal. In another embodiment, provision is made for filling cutout portions in the disk to impede the gripping surfaces. In still another embodiment, replacement disks are not used but, instead, some type of mechanism is employed to prevent the original disks from being unlocked except by authorized users. This can be accomplished, for example, by set screws or the like which protrude through the original disks at their marginal portions to engage an underside finger or shelf of the mouse body to prevent the disk from being rotated.

BRIEF DESCRIPTION OF THE DRAWINGS

Various advantages of the present invention will become apparent to those skilled in the art after having the benefit of studying the foregoing specification and drawings, in which:

FIG. 1 is a top perspective view of a generic computer mouse;

FIG. 2 is a bottom view of one type of prior art computer mouse;

FIG. 3 is a bottom view of another type of prior art computer mouse;

FIG. 4 is a disk made in accordance with the teachings of one embodiment of the present invention;

FIG. 5 is a cross-sectional view illustrating the disk of FIG. 4 in a locked position on a computer mouse and, additionally, showing a tool for removing the disk by an authorized user;

DESCRIPTION OF THE PREFERRED EMBODIMENTS

Figure 6:
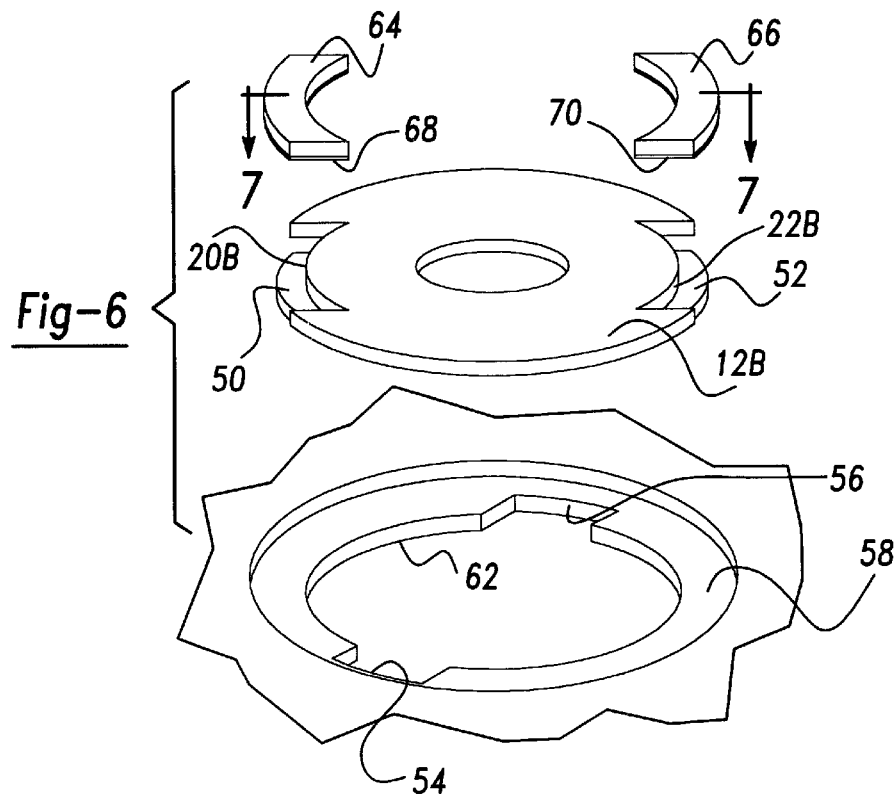
FIG. 6 is an exploded perspective view showing an alternative embodiment in which inserts are used in cooperation with the type of disk used for the computer mouse shown in FIG. 3.

It should be understood from the outset that while this invention is described in connection with several preferred embodiments, various alternative designs will become apparent to those skilled in the art after having the benefit of studying the foregoing specification, drawings and claims. Therefore, the following description and drawings should not be considered to be the only ways for practicing this invention.

With this caveat in mind, the present invention generally relates to some type of means for removing the gripping surfaces that are typically found on the disks of a mouse for a computer. This would prevent vandals from rotating the disk or otherwise removing it to obtain access to the trackball for unauthorized purposes. There are, of course, a variety of designs for computer mice and an equally large number of provisions to permit the disk to be rotated in order to allow the trackball to be removed. As a general rule, there are gripping surfaces on the disks for typical computer mice and, to the extent possible, these gripping surfaces are removed or impeded according to the present invention. In their place some type of means is provided to allow only authorized users to move the disks in order to remove the trackball or, at least, there is some type of provision for making it difficult for vandals to remove the trackballs from the mouse.

One way of accomplishing this objective is illustrated in FIGS. 4 and 5. In this embodiment, an annular disk 24 is provided in which the outer surface 26 is generally smooth and devoid of gripping surfaces. A plurality of small sockets 28, 30 are spaced about the outer surface of disk 24. The sockets 28, 30 are small enough that they are difficult to grip by human fingers. The disk 24 is in, other respects, similar to the disk 12A shown in FIG. 2. As shown in FIG. 5, disk 24 includes the usual radially outward projecting tangs 32, 34 for respectively engaging the typical radially inward projecting shelf portions or fingers 36, 38 to lock disk 24 in place in the well 25 on the lower body surface 40 of the computer mouse. Since disk 24 is devoid of gripping surfaces, it is difficult for unauthorized users to remove disk 24 to remove ball 14. Authorized users, however, are provided with a specially designed tool 42. The tool 42 includes a handle 44 and a plurality of pins 46, 48 which correspond with sockets 28, 30. Authorized users can remove disk 24 by inserting the pins 46, 48 into sockets 28, 30 and rotating handle 44 to cause a similar rotation of disk 24 to its unlocked position for removal of ball 14.

Figure 7:
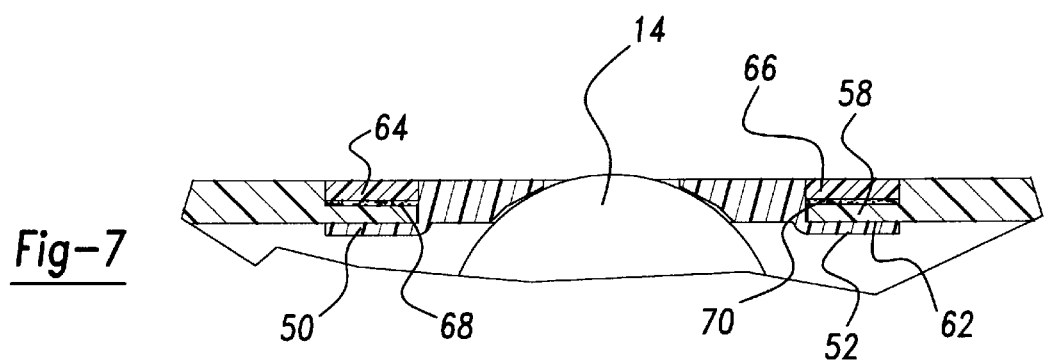
FIG. 7 is a cross-sectional view along the lines 7—7 of FIG. 6 in which the inserts are in place on the computer mouse.

FIGS. 6 and 7 are directed to another embodiment of this invention for use with disks such as disk 12B as shown in FIG. 3. As indicated before, disk 12B includes cutouts 20B, 22B which allow the human fingers to grip the disk and rotate it to a position in which the tangs 50, 52, located beneath the plane of gripping surfaces 20B, 22B, become aligned with reliefs 54, 56 formed in the recessed shelf 58 in the lower outer surface of the mouse body. When fingers 50, 52 become aligned with the reliefs 54, 56, the disk 12B can be lifted from the mouse body and the ball 14 removed. FIG. 7 illustrates the disk 12B in its locked position in which the disk has been rotated so that the tangs 50, 52 engage the inner surface 62 of shelf 58. In this embodiment, the present invention contemplates the use of two inserts 64, 66 to impede the gripping surfaces provided by cutouts 20B, 22B. Each insert 64, 66 is shaped to fill the cavity defined by the cutouts 20B, 22B. As shown in FIG. 7, the inserts 64, 66 are placed in the cavity defined by the cutouts so that the gripping surfaces are masked to prevent unauthorized rotation of disk 12 to remove the ball 14. Preferably, the inner surfaces of inserts 64, 66 are provided with a layer of adhesive 68, 70 to secure the inserts 64, 66 to outer surface of shelf 58. Some provision should be made for allowing an authorized user to remove the inserts 64, 66. This can be accomplished in a variety of ways such as by choosing the adhesive so that it is weak enough that an authorized user can pry the inserts away from the mouse body with a specially designed tool. Alternatively, the adhesive can be of a type which becomes detackified when exposed to a preselected frequency of light or electromagnetic energy. Of course, replacement disks could be provided for this type of mouse construction in which the disk is completely annular to eliminate the gripping surface that are otherwise provided by the cutouts. In this case, sockets can be provided on the outer surface of the disk for use with a tool similar to that shown in FIGS. 4 and 5.

Figure 8:
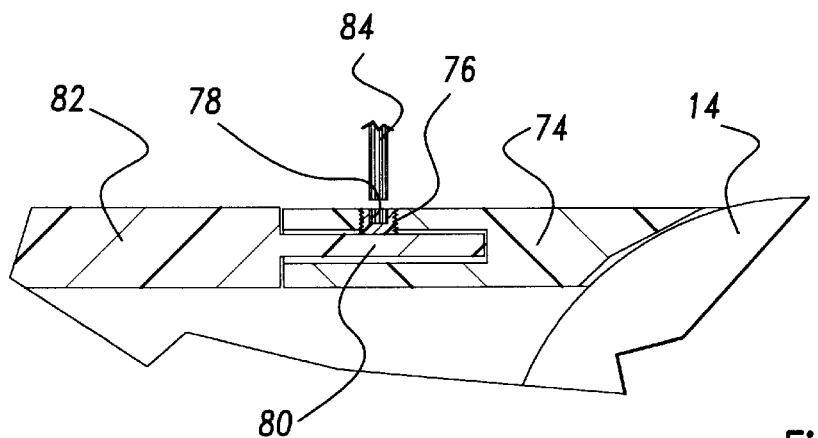
FIG. 8 is a cross-sectional view illustrating a third embodiment of the present invention.

FIG. 8 illustrates still another embodiment of this invention in which the disk 74 includes a set screw 76 with a recessed socket 78 therein. The set screw 76 is located on the outer marginal periphery of disk 74 so that, when tightened, it engages a portion of the conventionally found finger or shelf 80 in mouse body 82. The engagement of the set screw 76 with shelf 80 prevents the disk 74 from being rotated to remove the ball 14. Since the set screw 76 is flush with or below the outer surface of disk 74, it is difficult for unauthorized users to grasp it to rotate the disk. A socket wrench 84 is, on the other hand, provided to an authorized user so that the set screw 76 can be unscrewed to release its engagement with shelf 80 to allow disk rotation.

It will become apparent to those skilled in the art that still other embodiments of this invention can be made without departing from the spirit and scope of the invention as defined by the following claims.

What is claimed is:

1. A tamper resistant computer mouse comprising:
   a mouse body having a lower surface;
   a trackball,
   a disk for holding the trackball in place in the mouse body;
   said disk having a plurality of spaced sockets therein while being essentially free of gripping surfaces that could otherwise move the disk by human fingers thereby minimizing potential vandalism to the computer mouse; and
   a tool having a plurality of pins, said tool enabling authorized personnel to remove the disk by engaging the pins with the sockets and rotating the disc to an unlocked position.

2. The computer mouse of claim 1 wherein there are two sockets in the disk and two pins in the tool.

3. A method of reducing vandalism to a computer mouse of the type having a conventional moveable disk that is moved to a first position to lock the disk to a portion of the mouse body to hold a trackball in place, with the disk being moveable to a second position to release the disk from the mouse body for removal of the trackball, said method comprising:
   removing the conventional disk;
   replacing the conventional disk with a replacement disk which has a generally smooth outer surface and a plurality of sockets therein; and providing authorized personnel with a tool for removing the disk when desired, said tool having a plurality of pins for engaging the sockets and moving the replacement disk as desired to the first and second position for authorized purposes.

4. The method of claim 3 wherein there are two sockets in the disk, two pins in the tool and wherein the tool has a handle for rotating the disk.

5. A computer mouse comprising:

a mouse body having a lower surface with a recessed radially inward projecting portion defining a well in the lower surface;

a trackball;

a disk having a smooth outer surface essentially free of gripping surfaces that could otherwise be engaged by human fingers to move the disk, said disk having a lower radially outwardly projecting portion for engaging the radially inward projecting portion of the mouse body to lock the disk in a locked position to hold the trackball in place; and the outer surface of the disk having a plurality of spaced sockets therein that are engageable by pins of a specially designed tool provided to authorized personnel which can use the tool to move the disk to an unlocked position to remove the ball.

6. The computer mouse of claim 5 wherein there are two sockets in the disk and two pins in the tool.

* * * * *